United States Patent
Brossette et al.

(10) Patent No.: US 8,650,968 B2
(45) Date of Patent: Feb. 18, 2014

(54) ARTICULATED LOAD TESTER

(76) Inventors: Shaun Brossette, Houma, LA (US); Arthur Keith McNeilly, Houma, LA (US)

(*) Notice: Subject to any disclaimer, the term of this patent is extended or adjusted under 35 U.S.C. 154(b) by 235 days.

(21) Appl. No.: 13/327,646

(22) Filed: Dec. 15, 2011

(65) Prior Publication Data
US 2012/0198944 A1 Aug. 9, 2012

Related U.S. Application Data

(60) Provisional application No. 61/440,975, filed on Feb. 9, 2011.

(51) Int. Cl.
*G01D 7/00* (2006.01)
*G01L 1/26* (2006.01)

(52) U.S. Cl.
USPC ............. 73/862.041; 73/862.392; 73/862.393

(58) Field of Classification Search
USPC ...................... 73/862.393, 862.392, 862.381, 73/862.391, 862.041
See application file for complete search history.

(56) References Cited

U.S. PATENT DOCUMENTS

| | | | |
|---|---|---|---|
| 6,494,103 B1* | 12/2002 | Loong | 73/788 |
| 6,848,322 B2* | 2/2005 | Scarborough | 73/850 |
| 6,935,196 B1* | 8/2005 | Tumlin | 73/862.393 |
| 7,155,987 B1* | 1/2007 | Tumlin | 73/862.393 |
| 7,240,569 B2 | 7/2007 | Foley et al. | |
| 7,284,447 B2* | 10/2007 | Scarborough | 73/850 |
| 7,954,554 B2* | 6/2011 | Shampine et al. | 166/385 |

\* cited by examiner

*Primary Examiner* — Lisa Caputo
*Assistant Examiner* — Jonathan Dunlap
(74) *Attorney, Agent, or Firm* — Warner J. Delaune; Baker Donelson, et al.

(57) ABSTRACT

A load testing device is provided, comprising a main beam and a pair of load testing assemblies operatively connected to the main beam. Each of the load testing assemblies includes a load applying member having a first ball at its terminal end; a spreader plate pivotally attached to the first ball to establish a first ball and socket joint enabling three rotational degrees of freedom about the first ball; a bracket pivotally connected to the spreader plate, wherein the bracket further includes a second ball extending toward the main beam; an adjustment beam pivotally attached to the second ball to establish a second ball and socket joint, and wherein the adjustment beam is slidably disposed relative to the main beam and lockable in one or more predetermined positions.

8 Claims, 5 Drawing Sheets

ARTICULATED LOAD TESTER

CROSS-REFERENCE TO RELATED APPLICATIONS

This nonprovisional patent application claims priority under 35 U.S.C. §119 to U.S. Provisional Application Ser. No. 61/440,975, filed on Feb. 9, 2011.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates primarily to devices used to test lifting points on equipment or containers prior to placing the equipment or container into service or after a period of specified time when inspection and/or re-testing is required.

2. Description of Related Art

Load testing can be performed by filling the container with sufficient weight or anchoring the equipment and subsequently applying the specified load for certification. This process is normally performed at a facility where the required pulling apparatus and anchoring/weighting process can be fitted to the container or equipment. In some cases, anchoring may not replicate actual loads that the container or equipment will be subjected to while in service. Additionally, the container or equipment must be transported to the facility where the loads and weighting process can be applied. One example of a mobile load testing apparatus is described in U.S. Pat. No. 7,240,569 to Foley, et al., which more accurately simulates typical loading and can be deployed to any location where the test is required. However, there is a continuing need for greater versatility in a mobile testing device, including an ability to self-align to evenly distribute the applied load. Such a feature is important in accounting for variations in attaching devices such as slings, chains, shackles, and pad eye locations.

SUMMARY OF THE INVENTION

A load testing device is provided, comprising a main beam; a pair of load testing assemblies operatively connected to the main beam, wherein each of the load testing assemblies includes: a load applying member having a first ball at its terminal end; a spreader plate pivotally attached to the first ball to establish a first ball and socket joint enabling three rotational degrees of freedom about the first ball; a bracket pivotally connected to the spreader plate, wherein the bracket further includes a second ball extending toward the main beam; an adjustment beam pivotally attached to the second ball to establish a second ball and socket joint, and wherein the adjustment beam is slidably disposed relative to the main beam and lockable in one or more predetermined positions.

Preferably, the main beam is a rectangular tube and includes a plurality of holes, wherein the adjustment beam includes a mating hole which is alignable with one of the plurality of holes on the main beam, and wherein the main beam and the adjustment beam are fixed to one another by a pin.

In a preferred embodiment, the load applying member is a ram extending from a hydraulic cylinder.

In a more specific embodiment, the spreader plate includes a ball housing and a ball nut threadably connected to one another to engage the first ball.

In most cases, the spreader plate includes a plurality of holes adapted to connect with shackles attached to equipment to be tested.

More preferably, the bracket is connected to the spreader plate at two locations using pivot pins.

Preferably, the adjustment beam includes a socket to accept the second ball, and further including a nut threadably engaged to the adjustment beam to retain the second ball.

BRIEF DESCRIPTION OF THE DRAWINGS

The aspects of the invention will now be described by way of example only with reference to the accompanying drawings, in which.

DETAILED DESCRIPTION OF THE PREFERRED EMBODIMENT

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
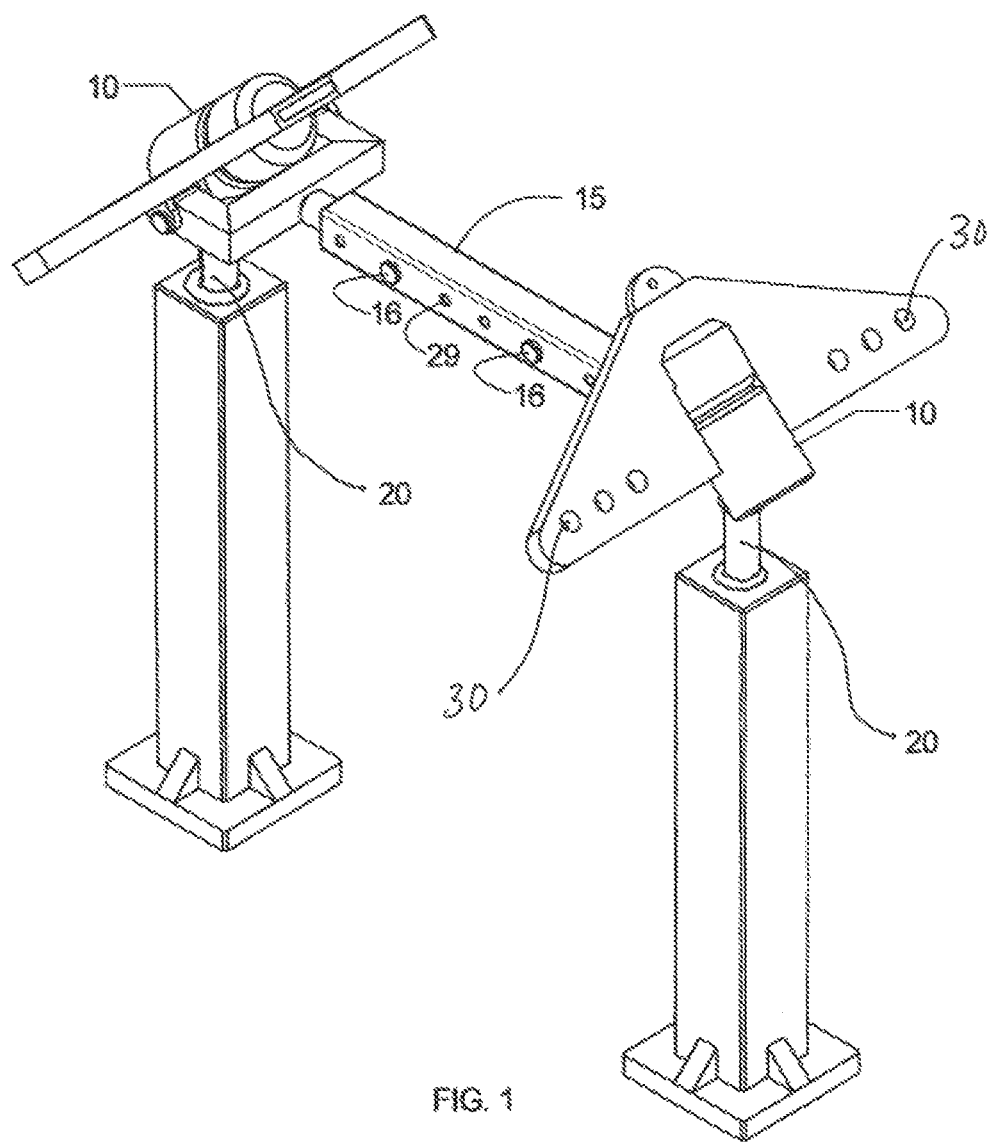
FIG. 1 is an assembly drawing depicting a tandem arrangement of two articulated load testers.

Turning now to the figures, FIG. 1 shows a perspective view of a tandem arrangement of the articulated load tester 10 mounted to load applying members 20, typically hydraulic rams extending from their respective hydraulic cylinders, coupled together by the main beam (typically a rectangular tube) 15 in telescoping fashion, wherein pins 16 are inserted through the holes 29 in the main beam 15 to lock the main beam 15 to the adjustment beams 19 (described below) at predetermined locations. Thus, the distance between the load testers 10 may be adjusted to accommodate the specific container or equipment being tested.

Figure 2:
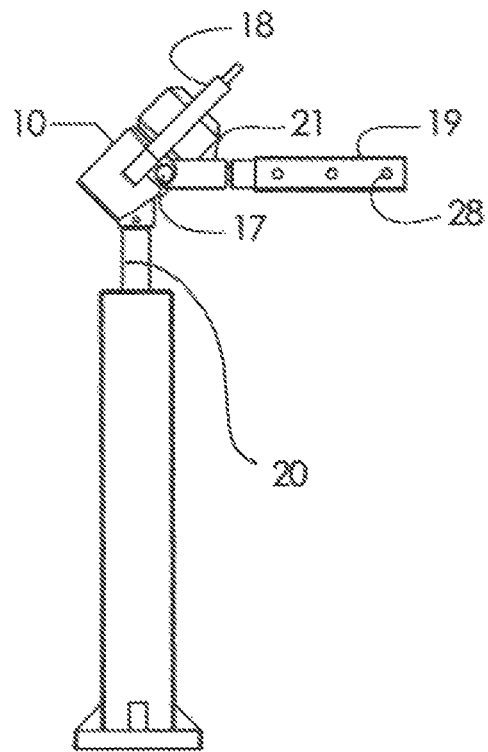
FIG. 2 is a side view of a single articulated load tester.
Figure 3:
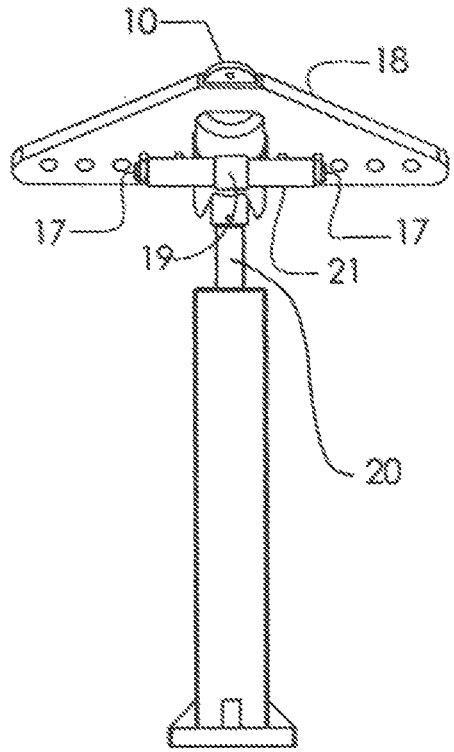
FIG. 3 is a front view of a single articulated load tester.
Figure 4:
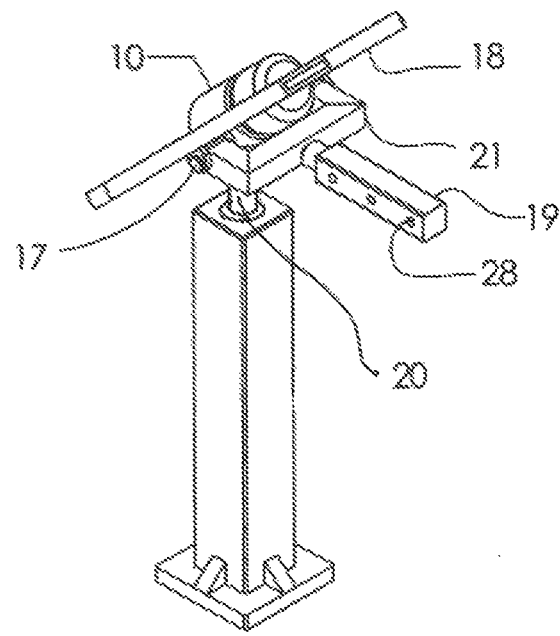
FIG. 4 is a perspective view of a single articulated load tester.

FIGS. 2-4 show side, front, and perspective views of a single articulated load tester 10 with the adjustment beam 19 exposed to show the holes 28 which align with the holes 29 in the main beam 15. Pivot pins 17 couple the bracket 21 in two locations to the spreader plate 18 and allow for pivotal movement between the spreader plate 18 and the bracket 21. The spreader plate 18 includes a plurality of holes 30 for attachment to slings, shackles, or other connections on the container 40, best shown in FIGS. 9 and 10.

Figure 5:
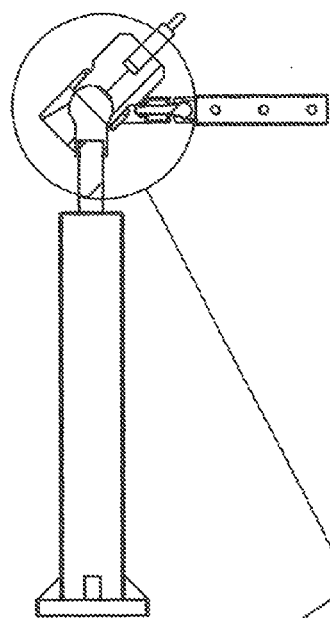
FIG. 5 is a section view of a single articulated load tester.
Figure 6:
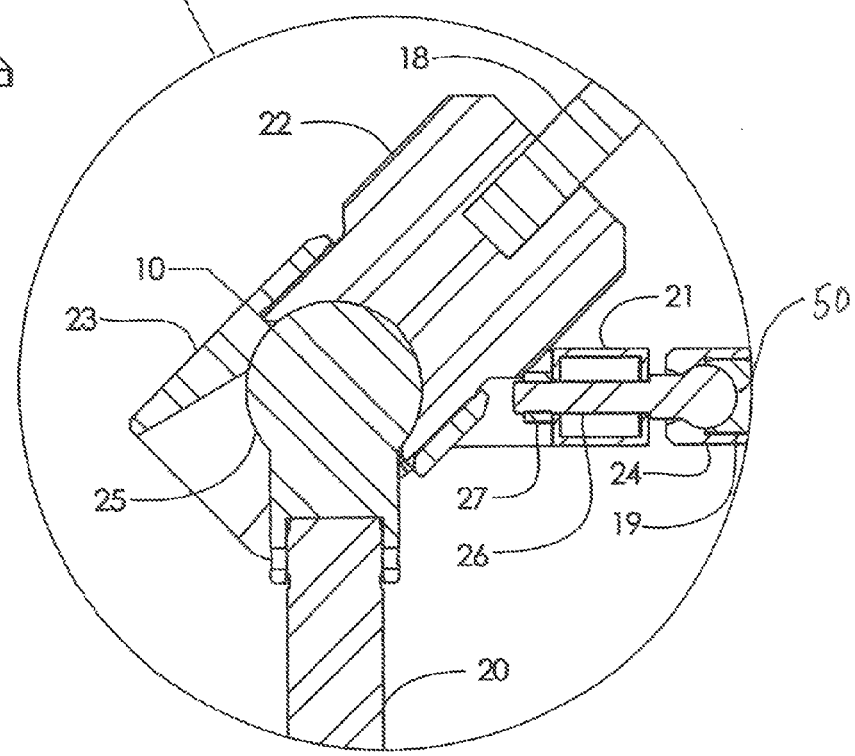
FIG. 6 is a detailed sectional view of load tester of FIG. 5.
Figure 7:
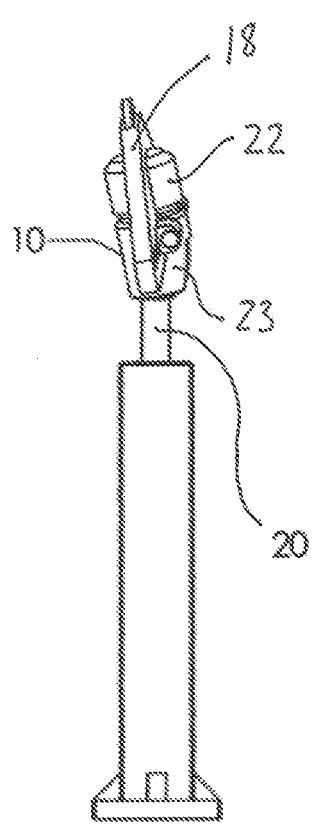
FIG. 7 is a side view of a single articulated load tester depicting rotation about the ball joint.
Figure 8:
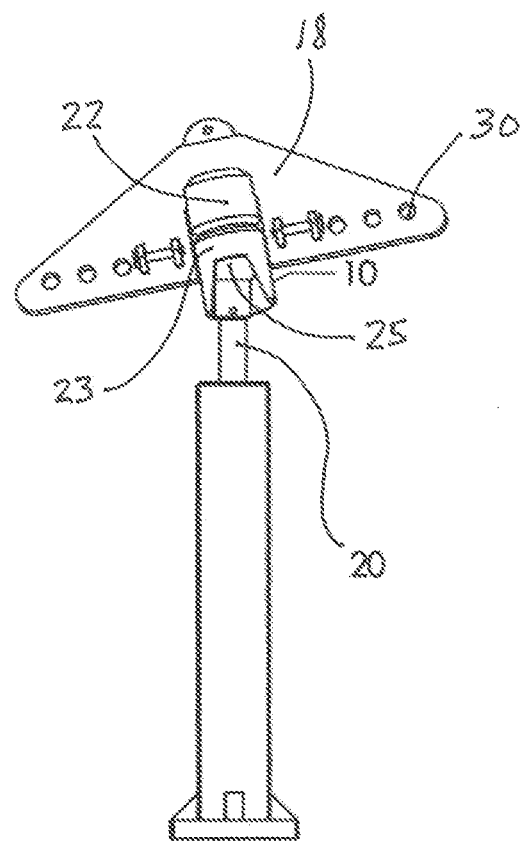
FIG. 8 is a front view of the load tester of FIG. 7.

FIG. 5 and FIG. 6 show a section view of the articulated load tester 10. The spreader plate 18 is attached by welding to the ball housing 22. The first ball 25 is attached to the hydraulic ram 20 by threads. The ball nut 23 is attached to the ball housing 22 by threads, thus capturing the first ball 25 so that the spreader plate 18 is allowed to pivot in three rotational degrees of freedom. Ball joint 26 is mated to a socket 50 formed in the end of the adjustment beam 19 and retained by the cap 24, which is threadably attached to the adjustment beam 19. Ball joint 26 is inserted through a centrally located hole in a bracket 21 and retained by the nut 27 threaded onto the end of the ball joint 26. This configuration of the ball 25, ball joint 26, and pivot pins 17 provides pivotal movement of the articulated load tester 10 in any direction to ensure that loads are distributed evenly regardless of variations in attachment devices such as slings, chains, shackles, and other connections to the equipment being tested.

Figure 9:
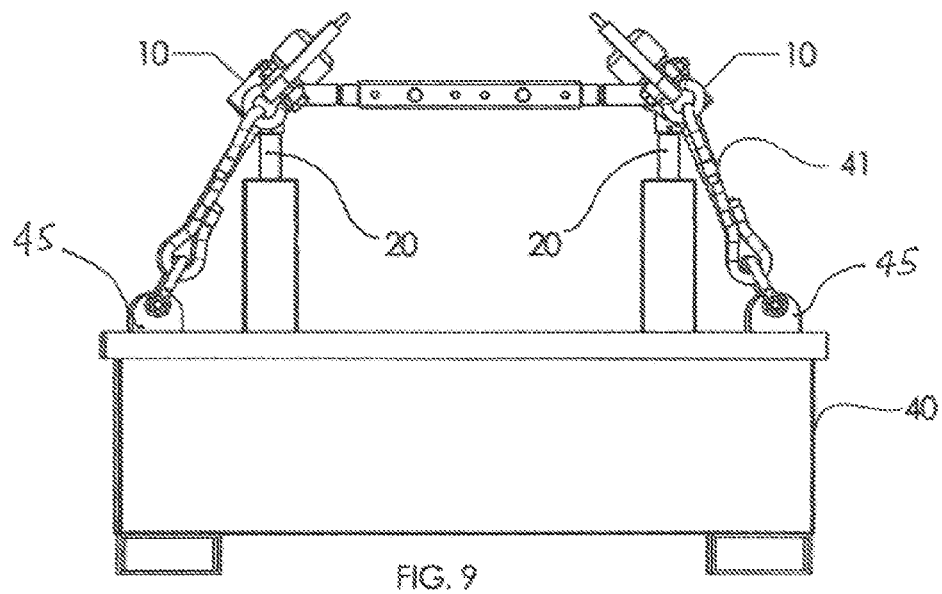
FIG. 9 is a front view of a tandem assembly of load testers attached to a typical container in an operating configuration.
Figure 10:
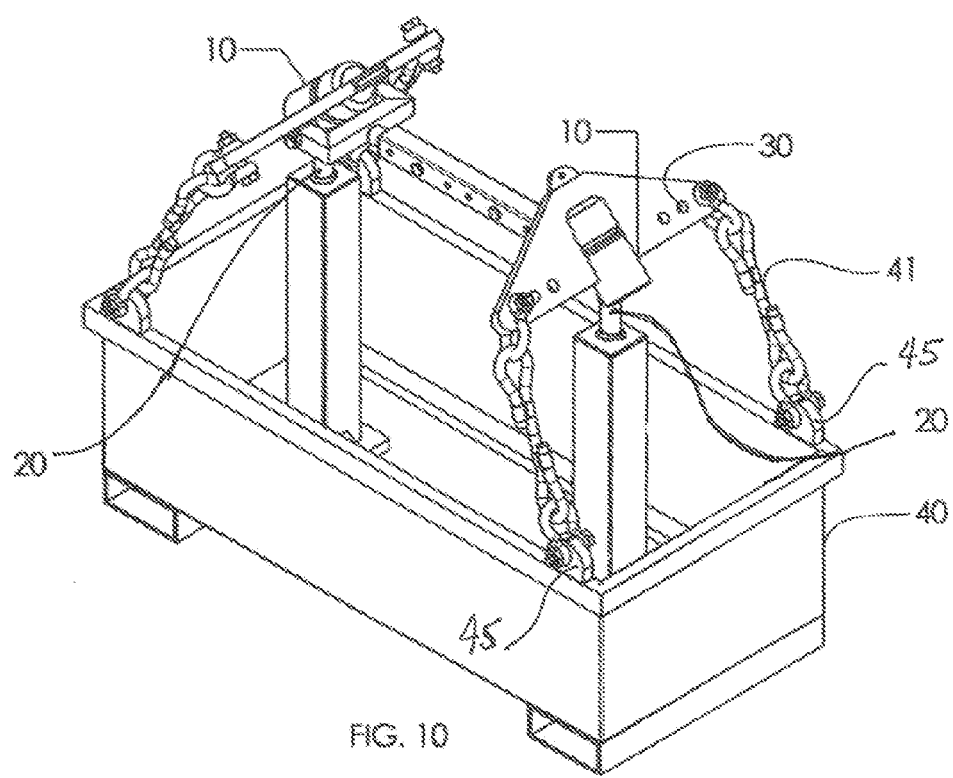
FIG. 10 is a perspective view of the load testers of FIG. 9.

FIG. 9 and FIG. 10 show a tandem arrangement of the articulated load testers 10 installed in a typical container 40 and attached by the holes 30 in the spreader plate 18 via slings and shackles 41. In operation, the hydraulic rams 20 are activated to push the spreader plates 18 away from the container 40, thus creating a predetermined pulling force on the pad eyes 45 of the container 40. As indicated previously herein, the spreader plate 18 and its connections to the adjustment beam 19 allow for variations in length of the shackles 41 by pivoting to evenly distribute the load.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only, and the scope of the present invention is to be limited only by the following claims.

The invention claimed is:

1. A load testing device, comprising:
   a main beam;
   a pair of load testing assemblies operatively connected to the main beam, wherein each of the load testing assemblies includes:
   a load applying member having a first ball at its terminal end;
   a spreader plate pivotally attached to the first ball to establish a first ball and socket joint enabling three rotational degrees of freedom about the first ball;
   a bracket pivotally connected to the spreader plate, wherein the bracket further includes a second ball extending toward the main beam;
   an adjustment beam pivotally attached to the second ball to establish a second ball and socket joint, and wherein the adjustment beam is slidably disposed relative to the main beam and lockable in one or more predetermined positions.

2. The device of claim 1, wherein the main beam includes a plurality of holes, wherein the adjustment beam includes a mating hole which is alignable with one of the plurality of holes on the main beam, and wherein the main beam and the adjustment beam are fixed to one another by a pin.

3. The device of claim 1, wherein the main beam is a rectangular tube.

4. The device of claim 1, wherein the load applying member is a ram extending from a hydraulic cylinder.

5. The device of claim 1, wherein the spreader plate includes a ball housing and a ball nut threadably connected to one another to engage the first ball.

6. The device of claim 1, wherein the spreader plate includes a plurality of holes adapted to connect with shackles attached to equipment to be tested.

7. The device of claim 1, wherein the bracket is connected to the spreader plate at two locations using pivot pins.

8. The device of claim 1, wherein the adjustment beam includes a socket to accept the second ball, and further including a nut threadably engaged to the adjustment beam to retain the second ball.

\* \* \* \* \*